June 16, 1953

G. H. TABER 2,641,851

LABORATORY APPARATUS FOR DEMONSTRATING
AND INTERPRETING GAUGE TESTS OF WHEELS

Filed March 6, 1951

Inventor

*George H. Taber*

By

*Shoemaker & Mattern*

Attorneys

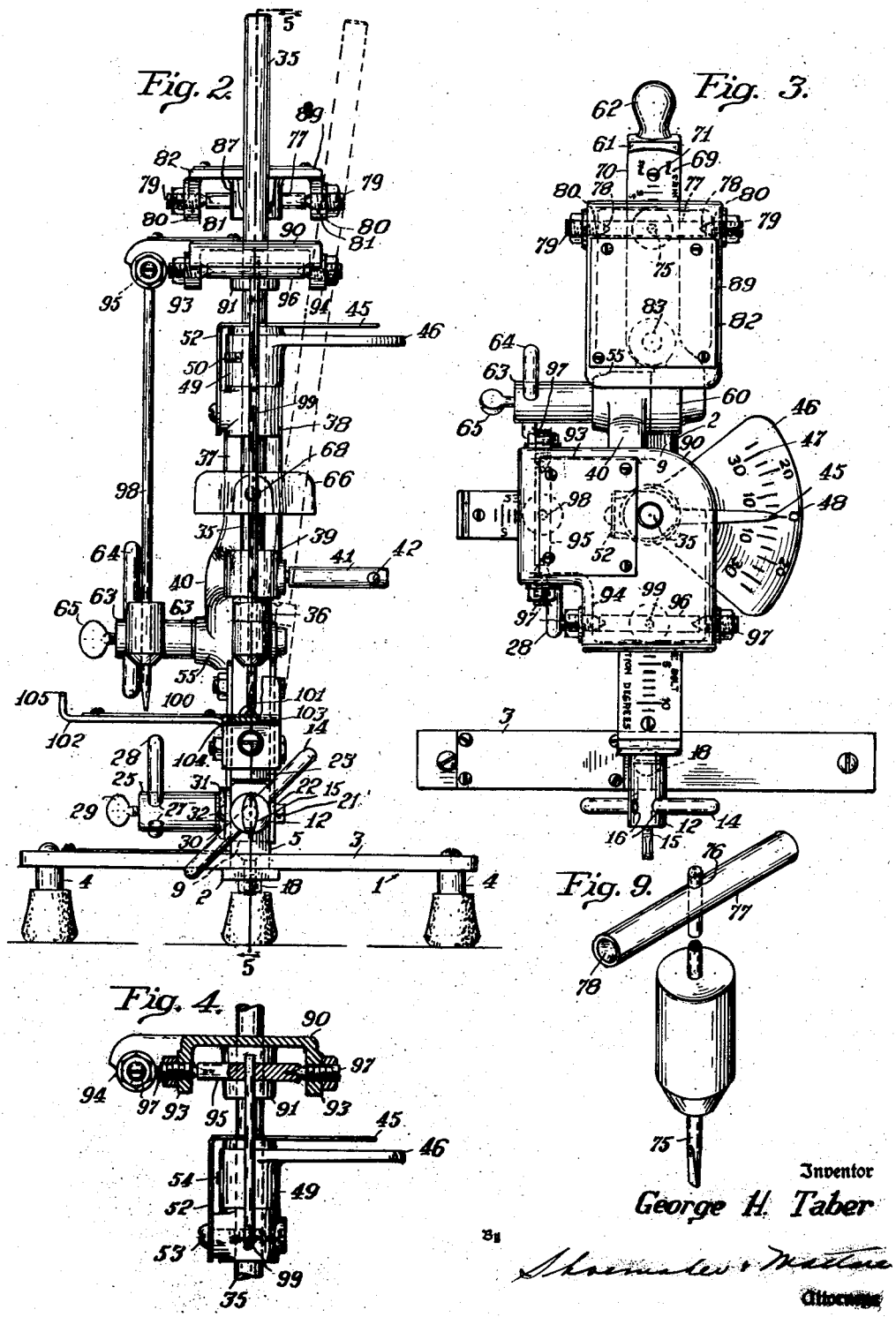

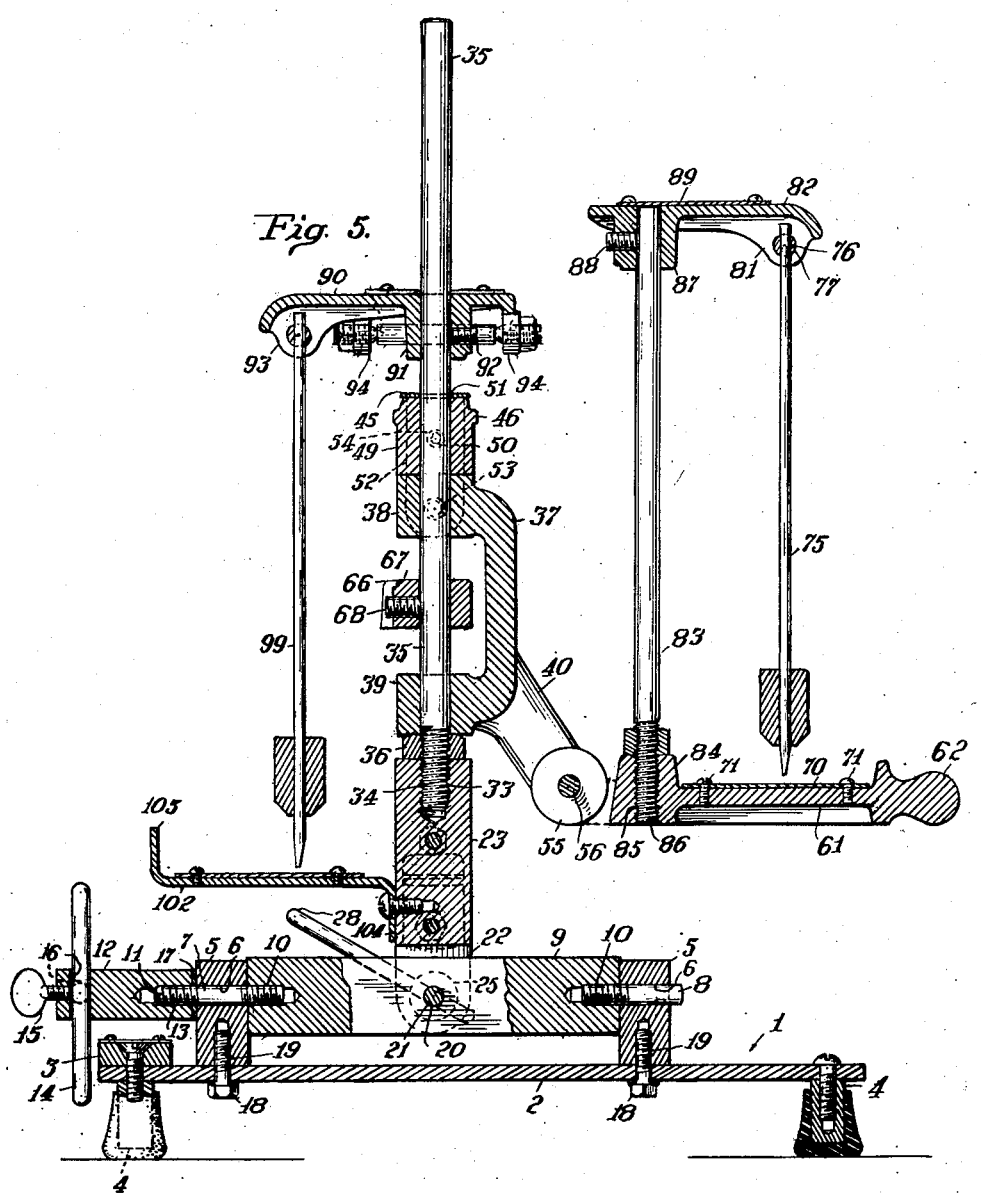

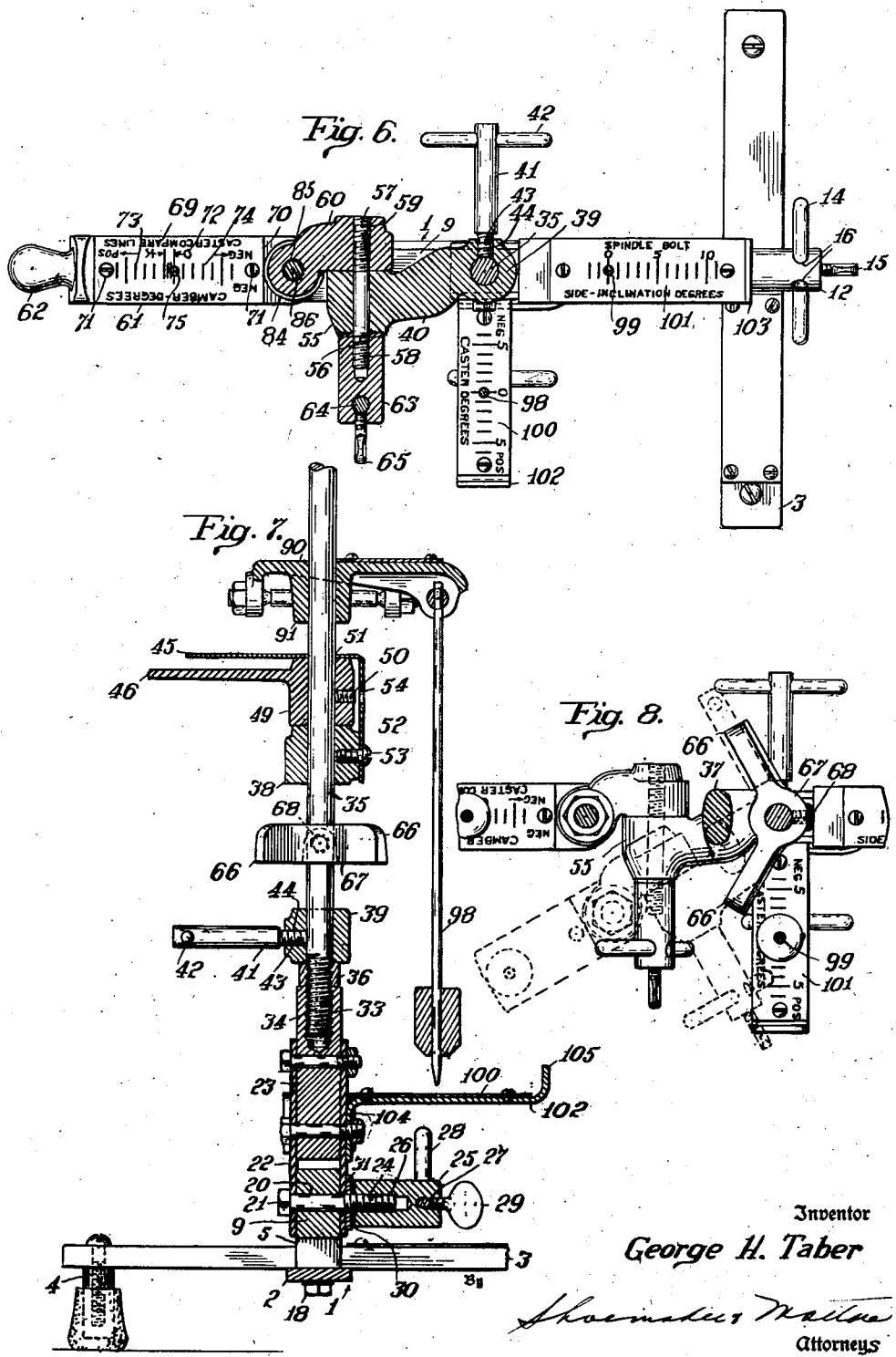

Patented June 16, 1953

2,641,851

UNITED STATES PATENT OFFICE 2,641,851

LABORATORY APPARATUS FOR DEMONSTRATING AND INTERPRETING GAUGE TESTS OF WHEELS

George H. Taber, Elmira, N. Y.

Application March 6, 1951, Serial No. 214,115

19 Claims. (Cl. 35—13)

The invention relates to a laboratory apparatus characterized by substitute wheel spindle, steering knuckle and steering spindle bolt for testing results of various angle combinations used to assist and maintain better automotive steering and is particularly adapted for use in connection with a gauge of a companion application filed March 6, 1951, Serial No. 214,114, now Patent No. 2,627,123, for indicating wheel camber degrees and testing results of automotive steering spindle bolt angle inclinations, but also applicable for use in connection with wheel gauges of a similar type.

The primary object of the present invention is to provide an apparatus of strong, durable and comparatively inexpensive construction, equipped with scales and gravity acting plumb bob pointers capable of being readily set to register wheel gauge tests of wheel camber and caster and side inclination of the steering knuckle spindle bolt or king pin, and of being adjusted as a unit to show the position of the plumb bob pointers in straight line driving position and in various degrees of right and left hand turning of the wheels, and of showing clearly the effect of any change in an automotive vehicle for correcting wheel camber and caster and side inclination as any change made to the camber angle produces a like change to side inclination, thereby enabling any faults in wheel camber and side inclination to be thoroughly understood so that accurate corrections of such faults may be made by proper instrumentalities.

A further object of the invention is to provide an apparatus of this character having elements or members corresponding to or representative of the steering wheel, the wheel spindle, the knuckle carrying the same, and the steering knuckle spindle bolt or king pin, and having a pivotal connection with a horizontal axis between the spindle and the knuckle to afford adjustment of the spindle in a vertical arc, thereby enabling laboratory tests to be made of proposed corrections and a simulation of the same so that the net results of the corrections will indicate accuracy in the correction of such faults and result in a minimum pull of the steering wheel either to the right or left.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 2 is an end elevation of the same viewed from the right of Fig. 1;

Fig. 3 is a plan view of the apparatus;

Fig. 4 is a detail sectional view taken on the line 4—4 of Fig. 1;

Fig. 5 is a vertical sectional view taken on the line 5—5 of Fig. 2;

Fig. 6 is a horizontal sectional view taken on the line 6—6 of Fig. 1;

Fig. 7 is a vertical sectional view taken on the line 7—7 of Fig. 1;

Fig. 8 is a horizontal sectional view taken on the line 8—8 of Fig. 1;

Fig. 9 is a detail perspective view of the plumb bob pointer and its transverse supporting spindle.

Figure 1:
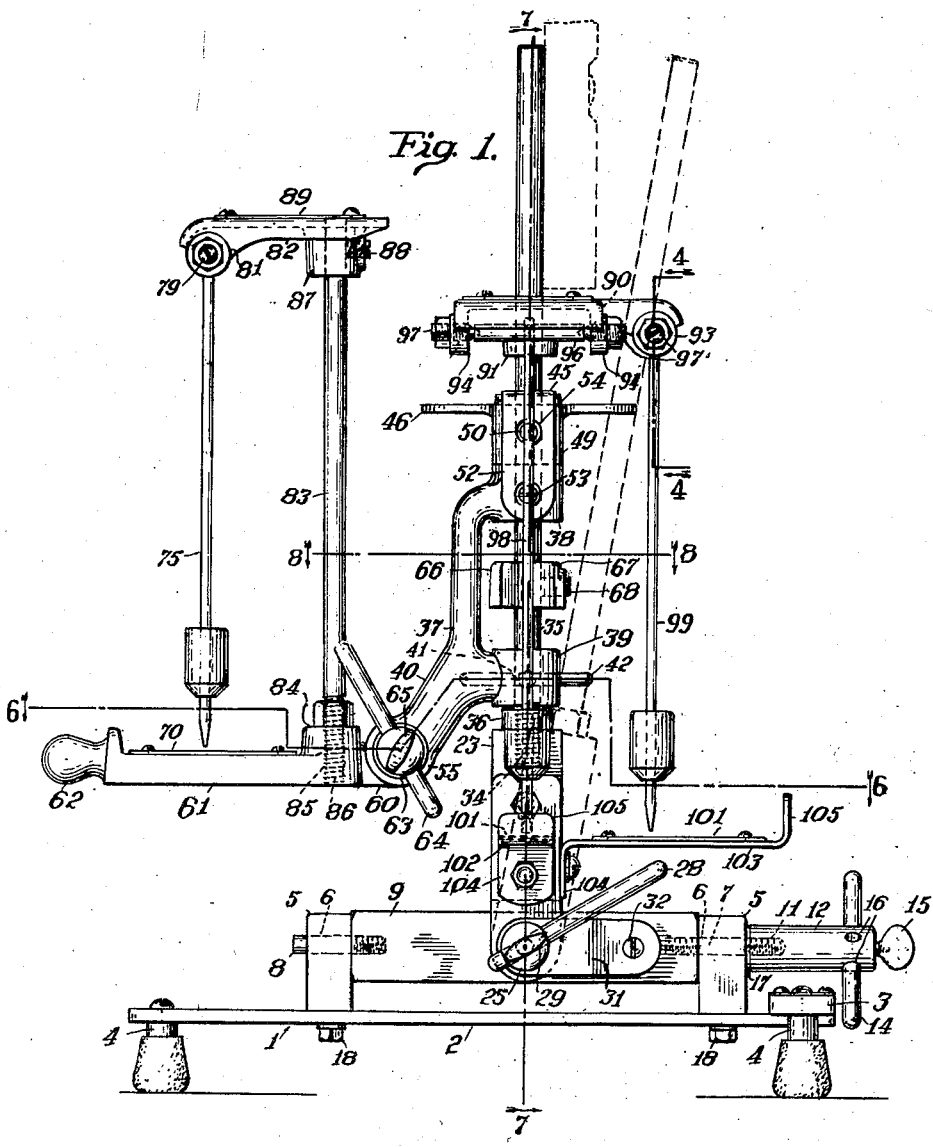
Fig. 1 is a front elevation of a demonstrator-interpretor apparatus constructed in accordance with this invention.

In the accompanying drawings, in which is illustrated the preferred embodiment of the invention, the apparatus is provided with a horizontal base 1 constructed of suitable metal and comprising a central longitudinal member 2 and a transverse member 3 centrally secured to one end of the longitudinal member 2 and extending from opposite sides thereof. The longitudinal and transverse members 2 and 3 consist of flat bars and are supported at the ends of the transverse member 3 and at the remote end of the member 2 by three rubber covered stub lugs 4, thereby making a tripod rest on any surface. The longitudinal base member 2 is provided at spaced points with rectangular bearing blocks 5 having aligned horizontal bearing openings 6 receiving journals 7 and 8 for pivotally mounting a caster axis rotatable member 9. The bearing blocks 5 have flat vertical side faces and the rotatable member 9, which is rectangular in cross section, has flat vertical side faces and flat horizontal upper and lower faces and also flat end faces which abut the inner opposed faces of the bearing blocks.

The journals 7 and 8 are preferably threaded into suitable sockets 10 in the ends of the horizontal pivotally mounted member 9 and the journal 7 has an extended outer threaded end portion 11 projecting beyond the adjacent bearing block 5 and engaged by a nut 12 in the form of a short piece of round bar metal provided at its inner portion with a threaded bore 13 to engage the threads of the extended end portion 11 of the journal 7. The nut 12 is provided with a handle 14 consisting of a straight piece of round metal and engaged by a set screw 15 mounted in the outer end of the nut 12 which is provided with diametrically opposed openings 16 adapted to receive the handle 14 which may be partially withdrawn from the nut to provide a lever action for turning the nut. The diametrically disposed openings 16 are provided for convenience in arranging the handle in the most desirable position for operating the nut 12 and a washer 17 of fiber or other suitable material is interposed between the inner end of the nut and the adjacent side face of the bearing block 7 to prevent injury to the flat side face of the bearing block. The bearing blocks which have flat lower end faces are detachably secured to the upper face of the longitudinal base member 1 by screws 18 which pierce the base member 1 and engage threaded sockets 19 in the lower portions of the bearing blocks, as clearly illustrated in Fig. 5 of the drawings.

The horizontal axially pivoted member 9 is provided with a central transverse bearing opening 20 for the reception of a transverse pivot bolt 21 which pierces front and rear jaws 22 consisting of vertically disposed flat plates having upper attaching portions secured to the front and rear faces of a vertical block 23. The pivot bolt 21 is provided at its rear end with a head for engaging the rear jaw 22 and it has a threaded front portion 24 projecting forwardly from the front jaw 22 and engaged by a clamping nut 25 provided at its inner portion with a threaded bore 26 for engagement with the threaded projecting portion of the bolt 21. The nut is provided at its outer end with diametrically arranged openings 27 adapted to receive an operating handle 28 adjustably secured to the nut by a set screw 29 mounted in the outer portion of the nut and arranged to engage the operating handle. The operating handle is adapted to be adjusted inwardly and outwardly to provide the necessary leverage for turning the nut 25 and a washer 30 of fiber or other suitable material is interposed between the inner end of the nut and a horizontal plate 31 secured at one end by a suitable fastening device 32 to the axially pivoted member 9 and extending to the central portion thereof and also interposed between the inner end of the nut 25 and the front jaw 22. The bolt 21 pierces the free end of the plate 31 which provides an increased surface for frictionally engaging the front jaw 22 under the clamping action of the nut 25.

The block 23, which is rectangular in cross section, has flat faces and it is provided at its upper end with a threaded socket 33 in which is mounted the lower threaded end portion 34 of a round vertical rod 35 which is rigidly secured to the upper end of the block by a clamping nut 36 arranged on the lower threaded portion of the rod 35 and engages the upper end face of the block 23. The round vertical rod, in the apparatus of the present invention, represents or corresponds to the steering knuckle bolt or king pin and is pivotally mounted for tilting movement longitudinally of the axially pivoted member 9 by the pivot bolt 21 and for tilting movement transversely of the said member 9 by the trunnions thereof. This will enable the king pin to be inclined forwardly and rearwardly and also laterally in either direction to arrange the king pin in the desired position to represent a test made by my wheel gauge. Viewed from the front, as in Fig. 1 of the drawings, the king pin may be set in a vertical or a forwardly or rearwardly inclined position and then, without altering such adjustment, it may be inclined either to the right or left to correspond to another test made by the wheel gauge.

The rod 35, representing the king pin, has mounted on it a steering knuckle member 37 consisting of a body portion arranged in substantial parallelism with the rod 35 and provided with upper and lower approximately horizontal arms having terminal sleeves 38 and 39 and a depending downwardly and outwardly inclined arm 40, as clearly illustrated in Fig. 1 of the drawings. The upper and lower sleeves 38 and 39 are arranged on the vertical round rod 35 which forms a pivot for the knuckle which is adapted to turn thereon similarly to the turning of the steering knuckle on the king pin of an automotive vehicle, for turning the front wheels from a straight forward driving position to a turning position either to the right or left. The steering knuckle member is locked in the selected adjusted position by a clamping screw 41 provided at its outer end with an operating handle 42 and having an inner reduced threaded end portion 43 mounted in a threaded opening 44 of the lower sleeve 39 and arranged to engage the vertical rod 35, as clearly illustrated in Fig. 7 of the drawings. Fibrous material may, if desired, be interposed between the end of the clamping screw 41 and the rod 35.

The steering knuckle member carries a pointer 45 extending radially from the rod 35 and arranged over a sector-shaped scale plate 46 provided with graduations 47 extending in opposite directions from a central zero mark 48. The sector-shaped scale plate 46 is provided with a hub 49 which is rigidly secured to the rod 35 by an Allen set screw 50. The pointer 45, which is constructed of sheet metal or any other suitable material, is arranged flat upon the hub 49 and it has an opening 51 through which the rod 35 passes and it is also provided with a depending attaching portion 52 secured by a screw 53 or other suitable fastening device to the upper sleeve 38 of the steering knuckle member. The attaching portion 52 is provided with an opening 54 adapted to afford access to the Allen screw 50. As the sector-shaped scale plate 46 is fixed to the king pin rod 35 and the pointer is fixed to the steering knuckle member, the pointer will move over the scale plate when the knuckle member 37 is turned on the rod 35 in either direction from a straight forward driving position indicated by the pointer when the same is located at zero 48. By this construction the steering knuckle member may be secured in the desired position by the clamping screw 41 for maintaining the steering knuckle rigid with the king pin and the pointer in a position indicating either that the steering knuckle is arranged in a straight forward driving position or when the automotive vehicle wheels are turned from such position either to the right or left and the degree of such turning.

The depending arm of the steering knuckle member is provided at its lower end with a bearing 55 receiving an Allen pivot bolt 56 having a central bearing portion arranged in said bearing 55 and having inner and outer threaded portions 57 and 58. The inner threaded portion 57 is secured in a threaded opening 59 in a lug or ear 60 of a bar or member 61 representing the wheel receiving spindle of an automotive vehicle and provided at its outer end with a knob or handle 62 which is designed to represent the steering wheel of an automotive vehicle by which the steering knuckle and the spindle carried thereby are turned on the king pin rod or member 35. The pivot bolt 56 is engaged at its outer threaded portion 58 by a clamping nut 63 provided with an operating handle 64 and having diametrically arranged openings for the reception of the handle which is secured in an adjusted position by a set screw 65 mounted in a threaded opening in the outer end of the nut as clearly illustrated in Fig. 6 of the drawings.

The swing of the steering knuckle member 37 is limited by a pair of spaced stop lugs 66 arranged at an obtuse angle to each other as clearly illustrated in Fig. 8 of the drawings and formed integrally with and extending from a sleeve 67 secured by an Allen set screw 68 or other suitable means to the king pin rod 35. The sleeve is located between the upper and lower arms or portions 38 and 39 of the steering knuckle member 37 and the stop lugs permit a full swing of the steering knuckle member from a central straight line steering position a distance representing a full turning movement of the automotive vehicle wheel to the right or left. The knob 62 operates the spindle member 61 and the steering knuckle member in the swinging movement of the steering knuckle member from a central position in either direction.

The spindle member 61, which has a flat upper face, is provided with a degree scale 69 which is a duplicate of the degree scale of the wheel gauge of the aforesaid application. It is preferably applied to the spindle member 61 by a scale plate 70 secured to the spindle member by screws 71 and slots may be provided, as explained in said application, for permitting an adjustment of the scale plate. The graduated scale is provided with a central zero degree indication mark 72 midway of positive and negative zones 73 and 74, and when spindle indications are tested by the wheel gauge of said application it is possible to compare the distance and location of the plumb bob pointer travel of each of two front wheels when the comparison test is made by the full limit of right and left steering movement of the steering wheel of the automotive vehicle, and the results of such tests made with the wheel gauge of said application may be reproduced by a plumb bob pointer 75 which is movable over the scale 69.

As explained in the aforesaid application, the camber degree graduations are actual degree space lines in relation to the radius of and from the plumb bob pointer's supporting axis.

The plumb bob pointer consists of a rod secured at its upper end in a central opening 76 in a transverse spindle 77 provided at its ends with cone bearing recesses 78 and supported by cone journal screws 79 mounted in threaded openings 80 of spaced side flanges 81 depending from a support 82 mounted upon a rod 83 extending upwardly from and arranged perpendicular to the spindle member 61 at the inner end thereof. The spindle member 61 is provided at its inner end with a boss or enlargement 84 having a threaded opening 85 receiving and engaged by the lower threaded end portion 86 of the rod 83. The support 82 preferably consists of a rectangular flat plate curved downwardly at the outer edge and provided at opposite sides with depending flanges. Adjacent its inner edge the support 82 is provided at its lower face with a depending boss or enlargement 87 having a central opening receiving the upper end of the rod 83 and the said support 82 is secured to said rod 83 by an Allen set screw 88 or other suitable fastening device.

A plate 89 of thin sheet metal or other suitable material is secured to the upper face of the support 82 and contains the following indicia:

To duplicate degrees of car, caster and inclination camber degree must be known.

---

A—Set caster to zero. Set inclination to 5 or 8 degrees.
B—With "Laboratory Knuckle" at "Straight Steering" set pointer to car wheel camber.
C—Now, swing "Knuckle" to limit of right and left steering positions.
D—Now, check law of cause for pointer travel over degree graduations.

---

For more pointer travel increase positive caster.

When the rod 83 is in a vertical position the plumb bob pointer 75 is also in a vertical position in parallelism with the rod 83. The plumb bob pointer 75 is adapted to swing inwardly and outwardly over the scale 69 which is provided, as explained in said wheel gauge application, with an O. K. zone located between the zero mark 72 and the first degree of the positive zone and for convenience the O. K. zone is divided into three equal spaces, as clearly illustrated in Fig. 6 of the drawings.

Mounted upon the king pin rod 35 and fixed to the same is a horizontal support 90 consisting of a flat plate of approximately rectangular form provided adjacent one corner thereof at its lower face with a depending boss or enlargement 91 having a central opening to receive the rod 35 and mounting an Allen set screw 92 for clamping the support 90 rigidly in position on said king pin rod 35. The support is provided at the front with downwardly curved edge portions and with spaced side flanges 93 and 94 between which are mounted spindles 95 and 96 constructed and arranged similarly to the spindle 77 and it is, therefore, unnecessary to explain in detail the mounting of each of the spindles 95 and 96. All of the cone screws are secured in their adjustment by clamping nuts 97, washers being preferably interposed between the nuts and the adjacent flanges. The adjustment of the cone bearing screws provides for controlling the swinging movements of the plumb bob pointers 98 and 99 which swing inwardly and outwardly in planes at right angles to each other and radially with respect to the king pin rod or member 35. The plumb bob pointers 98 and 99 are constructed similarly to the plumb bob pointer heretofore described and are similarly connected at their upper ends to their respective spindles. The plumb bob pointer 98 swings in a plane transversely of the axially pivoted horizontal supporting member 9 and the plumb bob pointer 99 swings in a plane longitudinally of the axially pivoted supporting member 9. These plumb bob pointers 98 and 99 swing over scales 100 and 101 having markings extending inwardly and outwardly from a zero marking midway between the ends of the scales. The scales are preferably provided on thin plates of sheet metal or other suitable material secured to arms 102 and 103 extending from the front face of the block 23 and from the right hand side face thereof, as viewed in Fig. 1 of the drawings, and in the opposite direction from the spindle member. These arms 102 and 103 have inner depending attaching portions 104 and upwardly extending outer flanges 105 which limit the outward swing of the plumb bob pointers.

The support 90 is provided with a plate having the following indicia:

DEMONSTRATOR

For varied effects from varied angle combinations used for causing steering forces.

Law of pointer travel—is—No travel, with zero caster and zero inclination. All travel is in positive zone with zero caster. With caster and inclination travel is over Pos. and Neg. Zones.

and the transverse base member has mounted on it a plate containing the following indicia:

THIS IS A LABORATORY

*Spindle bolt-steering knuckle-test method.*—To reduce time and effort. To teach car owners how angles for steering set up steering forces that must be in a proper range of degree balance for minimum "Pull" steering.

The indicia carrying plates may be mounted in any other desired manner, as will be readily understood. The data provided on such plates is designed to facilitate the use of the apparatus and will be readily understood by those skilled in the art of making such tests and corrections.

It will be clear that the laboratory apparatus of the present invention is adapted to physically prove results of caster and side inclination of the spindle bolt of automotive vehicles without being directly associated with an automotive vehicle; that by its provisions and operation it may be used as a means to translate the location and range of plumb bob pointer travel of the gauge of said companion application having the exact duplicate type of graduated scale, after tests have been made by attaching said gauge to an automotive vehicle wheel and the same tested for determining degrees of caster and spindle bolt side inclination, and that through the use of the laboratory apparatus of the present invention a person becomes quickly enlightened as to what happens or could happen through various adjustments and that correction of faulty findings may be accurately made and that because of better steering of the vehicle the accuracy of such corrections will be appreciated by the driver.

It is clear that the apparatus provides a representative automotive steering knuckle wheel bearing spindle provided with adjustable means to maintain wheel zero camber degree regardless of the various degrees of side inclination to which the representative steering knuckle spindle bolt might be set and this apparatus also includes a representative automotive steering wheel through which the representative members are caused to move as with the actual steering of an automotive vehicle. The swing axis of the caster plumb bob assembly is parallel to the prime caster axis of the horizontal rotatable member 9, and the swing axis of the side inclination of the side swing plumb bob pointer is at right angles or 90° to said prime caster axis.

The laboratory apparatus provides, by proof tests, facts which will be appreciated by those skilled in the art of correcting automotive steering problems and who have had actual experience with automotive steering correctional problems.

Because of identical composite graduated indication scales of the present invention and the gauge of said co-pending application and the plumb bob pointers which coact with the scales, the result of comparison tests for caster and side inclination may be converted to substantially actual degrees of caster and angle inclination through the tilting of the substitute spindle bolt until the plumb bob pointer associated therewith travels over the composite scale of the laboratory apparatus of the present invention, duplicates that recorded or indicated by comparison tests of spindle inclinations of tested wheels. The degree of caster inclination and the degree of side inclination may be noted by observing the location of the plumb bob pointers over the related graduated scales.

I claim:

1. A demonstrating apparatus of the class described comprising a base, a horizontal member journaled on the base for rotary movement on its horizontal longitudinal axis, a vertical member comprising a lower block and an upper round rod mounted on the block, means for pivotally connecting the block with the horizontal member for tilting movement of the vertical member longitudinally of said horizontal member, a knuckle member having upper and lower bearing portions mounted on the round rod for rotary movement on the same, a horizontal scale plate having a hub portion mounted on the rod and provided with a set screw rigidly securing the scale plate to said rod, and a pointer extending over the scale plate and having a depending portion rigidly secured to the knuckle, the depending portion being also provided with an opening adapted through rotary movement of the knuckle to be arranged opposite said set screw to permit an instrument to engage the same.

2. A demonstrating apparatus of the class described comprising a base, a horizontal member journaled on the base for rotary movement on its horizontal longitudinal axis, a vertical member comprising a lower block and an upper round rod mounted on the block, means for pivotally connecting the block with the horizontal member for tilting movement of the vertical member longitudinally of said horizontal member, a knuckle member having spaced upper and lower bearing portions mounted on the round rod, a stop member located between the bearing portions of the knuckle member and consisting of a hub portion secured to the round rod and arms projecting from the hub portion at opposite sides of the knuckle member for limiting the rotary movement of the same on the round rod, and scale means consisting of a scale plate and a pointer, one of which is fixed to the round rod and the other to the knuckle member.

3. An automotive steering and inclination angles demonstrator comprising a base, a horizontal member journaled on the base for rotary movement on its horizontal longitudinal axis, a vertical member composed of a lower block rectangular in cross section and an upper round rod mounted on the block, means for pivotally mounting said block on the horizontal member for tilting movement longitudinally thereof, and a support secured to the upper portion of the vertical rod and extending laterally therefrom at substantially a right angle, gravity acting pointer members suspended from said support and arranged to swing in planes at right angles to each other and longitudinally and transversely of said horizontal member, and scale supporting plates secured to the block and extending therefrom at right angles thereto and provided with graduations cooperating with the pointer members for indicating the extent of tilting movement of the vertical member longitudinally thereof and also transversely of the same on the longitudinal axis of the horizontal member.

4. An automotive steering and inclination angles demonstrator comprising a base, a horizontal member journaled on the base for rotary movement on its horizontal longitudinal axis, a vertical member composed of a lower block rectangular in cross section and an upper round rod mounted on the block, means for pivotally mounting said block on the horizontal member for tilting movement longitudinally thereof, and a horizontal support secured to the upper portion of the vertical rod, gravity acting pointer members suspended from the horizontal support and arranged to swing in planes at right angles to each other and longitudinally and transversely of said horizontal member, scale supporting plates secured to the block and extending therefrom at right angles thereto and provided with graduations cooperating with the pointer members for indicating the extent of tilting movement of the vertical member longitudinally thereof and also transversely of the same on the longitudinal axis of the horizontal member, a knuckle member mounted on the round rod for horizontal rotary movement thereon, a horizontal scale plate secured to said rod, and a pointer carried by the knuckle member and extending over the horizontal scale plate and movable over the graduations thereof when the knuckle member is turned on said rod.

5. A demonstrating apparatus of the class described comprising a base, a horizontal member journaled on the base for rotary movement on its horizontal longitudinal axis, a vertical member composed of a lower block rectangular in cross section and an upper round rod mounted on the block, means for pivotally mounting said block on the horizontal member for tilting movement longitudinally thereof, and a horizontal support secured to the upper portion of the vertical rod, gravity acting pointer members suspended from the horizontal support and arranged to swing in planes at right angles to each other and longitudinally and transversely of said horizontal member, scale supporting plates secured to the block and extending therefrom at right angles thereto and provided with graduations cooperating with the pointer members for indicating the extent of tilting movement of the vertical member longitudinally thereof and also transversely of the same on the longitudinal axis of the horizontal member, a knuckle member mounted on the round rod for horizontal rotary movement thereon, a horizontal scale plate secured to said rod, a pointer carried by the knuckle member and extending over the horizontal scale plate and movable over the graduations thereof when the knuckle member is turned on said rod, a horizontal spindle member mounted on the knuckle member for pivotal movement in the vertical plane of said rod, and means for securing the spindle member in pivotal adjustment with respect to said knuckle member.

6. A demonstrating apparatus of the class described comprising a base, a horizontal member journaled on the base for rotary movement on its horizontal longitudinal axis, a vertical member composed of a lower block rectangular in cross section and an upper round rod mounted on the block, means for pivotally mounting said block on the horizontal member for tilting movement longitudinally thereof, and a horizontal support secured to the upper portion of the vertical rod, gravity acting pointer members suspended from the horizontal support and arranged to swing in planes at right angles to each other and longitudinally and transversely of said horizontal member, scale supporting plates secured to the block and extending therefrom at right angles thereto and provided with graduations cooperating with the pointer members for indicating the extent of tilting movement of the vertical member longitudinally thereof and also transversely of the same on the longitudinal axis of the horizontal member, a knuckle member mounted on the round rod for horizontal rotary movement thereon, a horizontal scale plate secured to said rod, a pointer carried by the knuckle member and extending over the horizontal scale plate and movable over the graduations thereof when the gnuckle member is turned on said rod, a horizontal spindle member mounted on the knuckle member for pivotal movement in the vertical plane of said rod, means for securing the spindle member in pivotal adjustment with respect to said knuckle member, a graduated scale carried by said spindle member, a gravity acting pointer cooperating with said graduated scale and movable in the vertical plane of the vertical rod, and means carried by the spindle member for pivotal suspension of said gravity acting pointer.

7. A demonstrating apparatus of the class described comprising a base, a horizontal member journaled on the base for rotary movement on its horizontal longitudinal axis, a vertical member composed of a lower block rectangular in cross section and an upper round rod mounted on the block, means for pivotally mounting said block on the horizontal member for tilting movement longitudinally thereof, and a horizontal support secured to the upper portion of the vertical rod, gravity acting pointer members suspended from the horizontal support and arranged to swing in planes at right angles to each other and longitudinally and transversely of said horizontal member, scale supporting plates secured to the block and extending therefrom at right angles thereto and provided with graduations cooperating with the pointer members for indicating the extent of tilting movement of the vertical member longitudinally thereof and also transversely of the same on the longitudinal axis of the horizontal member, a knuckle member mounted on the round rod for horizontal rotary movement thereon, a horizontal scale plate secured to said rod, a pointer carried by the knuckle member and extending over the horizontal scale plate and movable over the graduations thereof when the knuckle member is turned on said rod, a horizontal spindle member mounted on the knuckle member for pivotal movement in the vertical plane of said rod, means for securing the spindle member in pivotal adjustment with respect to said knuckle member, a graduated scale carried by said spindle member, a gravity acting pointer movable over the scale of the spindle member, a vertical supporting rod fixed at its lower end to the spindle member at the inner end of the graduated scale thereof and provided at its upper portion with a horizontal support having means for pivotal suspension of said gravity acting pointer for movement of the same in the vertical plane of said vertical member.

8. In a demonstrating apparatus of the class described comprising a base, a horizontal member journaled on the base for rotary movement on its horizontal longitudinal axis, a vertical member pivotally mounted on the horizontal member for tilting movement longitudinally of the same, a knuckle member mounted on the vertical member for horizontal rotary movement thereon and provided at the bottom with a bearing, a horizontal pivot mounted on the bearing, a spindle member provided at its inner end with a bearing portion mounted on said horizontal pivot in abutting relation with the bearing of the knuckle, means mounted on said horizontal pivot for clamping the spindle member in frictional engagement with the knuckle member, a scale carried by the spindle member and disposed longitudinally thereof, a vertical supporting rod mounted on the spindle member and located at the inner end of the scale, a support secured to the upper end of the said rod, and a gravity acting pointer pivotally hung from said support and movable over said scale in the vertical plane of said vertical member.

9. A demonstrating apparatus of the class described comprising a base, composed of a horizontal longitudinal bar, a transverse bar centrally secured to the longitudinal bar at one end thereof and short supporting legs secured to the ends of the transverse bar and the remote end of the longitudinal bar forming a tripod support for the apparatus, a horizontal member extending longitudinally of the longitudinal bar of the base and journaled thereon for rotary movement on its horizontal longitudinal axis, a vertical member pivotally mounted on the horizontal member centrally thereof, a knuckle member mounted on the vertical member for horizontal rotary movement on the same, a support fixed to the upper portion of the vertical member, gravity acting pointers pivotally suspended from said support and movable in planes at right angles to each other and longitudinally and transversely of said horizontal member, scales carried by the vertical member and extending therefrom at right angles thereto and cooperating with said gravity acting pointers for indicating tilting movement of the vertical member longitudinally of the horizontal member and also transversely of the same on the longitudinal axis thereof, a horizontal spindle member extending outwardly from the knuckle member and pivotally connected at its inner end with the knuckle member for pivotal adjustment in the vertical plane of the vertical member, a scale extending longitudinally of the spindle member, supporting means carried by the spindle member and extending upwardly therefrom, and a gravity acting pointer pivotally suspended from said supporting means and movable in the vertical plane of the vertical member and cooperating with the scale of the spindle member for indicating pivotal adjustment thereof.

10. A demonstrating apparatus of the class described comprising a base, composed of a horizontal longitudinal bar, a transverse bar centrally secured to the longitudinal bar at one end thereof and short supporting legs secured to the ends of the transverse bar and the remote end of the longitudinal bar forming a tripod support for the apparatus, a horizontal member extending longitudinally of the longitudinal bar of the base and journaled thereon for rotary movement on its horizontal longitudinal axis, a vertical member pivotally mounted on the horizontal member centrally thereof, a knuckle member mounted on the vertical member for horizontal rotary movement on the same, a support fixed to the upper portion of the vertical member, gravity acting pointers pivotally suspended from said support and movable in planes at right angles to each other and longitudinally and transversely of said horizontal member, scales carried by the vertical member and extending therefrom at right angles thereto and cooperating with said gravity acting pointers for indicating tilting movement of the vertical member longitudinally of the horizontal member and also transversely of the same on the longitudinal axis thereof, a horizontal spindle member extending outwardly from the knuckle member and pivotally connected at its inner end with the knuckle member for pivotal adjustment in the vertical plane of the vertical member, a scale extending longitudinally of the spindle member, supporting means carried by the spindle member and extending upwardly therefrom, a gravity acting pointer pivotally suspended from said supporting means and movable in the vertical plane of the vertical member and cooperating with the scale of the spindle member for indicating pivotal adjustment thereof, a horizontal graduated scale plate fixed to the vertical member, a pointer carried by the knuckle member and extending over the horizontal scale plate and movable over the graduations thereof when the knuckle is turned on the vertical member, and an operating member extending from the spindle member for turning the knuckle member on the vertical member.

11. An automotive steering and inclination angles demonstrator comprising a base, a horizontally disposed member journaled on the base for rotary movement about a horizontal axis, an upwardly extending member pivotally mounted on said horizontally disposed member for tilting movement longitudinally of the axis of rotation of said horizontally disposed member, a knuckle member mounted on said upwardly extending member for rotary movement in a plane at a right angle to the longitudinal axis of said upwardly extending member, and means for indicating pivotal movement of the upwardly extending member longitudinally and transversely of the axis of rotation of said horizontally disposed member, said means including separate gravity acting means carried by and movable relative to said upwardly extending member in separate planes longitudinally and transversely of the axis of rotation of said horizontally disposed member.

12. An automotive steering and inclination angles demonstrator comprising a base, a horizontally disposed member journaled on the base for rotary movement about a horizontal axis, an upwardly extending member pivotally mounted on said horizontally disposed member for tilting movement longitudinally of the axis of rotation of said horizontally disposed member, a knuckle member mounted on said upwardly extending member for rotary movement in a plane at a right angle to the longitudinal axis of said upwardly extending member, a spindle member extending laterally from the knuckle member and pivotally connected at its inner end with said knuckle member for pivotal adjustment in the plane of the longitudinal axis of said upwardly extending member, and means for indicating the extent of movement of the upwardly extending member, the knuckle member and the spindle member from predetermined positions including pointers and scales operatively associated therewith.

13. An automotive steering and inclination angles demonstrator comprising a base, a horizontally disposed member journaled on the base for rotary movement about a horizontal axis, an upwardly extending rod pivotally mounted on the horizontally disposed member for tilting movement longitudinally of the axis of rotation of the horizontally disposed member, a knuckle member mounted on the upwardly extending rod for rotary movement in a plane at right angles to the longitudinal axis of said rod, gravity acting pointer members suspended from the rod and arranged to swing in separate planes at right angles to each other and longitudinally and transversely with respect to the axis of rotation of the horizontally disposed member, separate scale means coacting with the pointer members for indicating pivotal movement of the upwardly extending rod longitudinally of the axis of rotation of the horizontally disposed member and pivotal movement transversely of the axis of rotation of the horizontally disposed member about said axis.

14. An automotive steering and inclination angles demonstrator comprising a base, a horizontally disposed member journaled on the base for rotary movement about a horizontal axis, an upwardly extending rod pivotally mounted on the horizontally disposed member for tilting movement longitudinally of the axis of rotation of the horizontally disposed member, a knuckle member mounted on the upwardly extending rod for rotary movement in a plane at right angles to the longitudinal axis of the rod, gravity acting pointer members suspended from the rod and arranged to swing in separate planes at right angles to each other and longitudinally and transversely with respect to the axis of rotation of the horizontally disposed member, separate scale means coacting with the pointer members for indicating pivotal movement of the upwardly extending rod longitudinally of the axis of rotation of the horizontally disposed member and pivotal movement transversely of the axis of rotation of the horizontally disposed member about said axis, and separate means for indicating the rotary movement of the knuckle member with respect to the upwardly extending rod including a scale plate and a pointer, one of which is fixed to the upwardly extending rod and the other to the knuckle member.

15. An automotive steering and inclination angles demonstrator comprising a base, a horizontally disposed member journaled on the base for rotary movement about a horizontal axis, an upwardly extending rod pivotally mounted on the horizontally disposed member for tilting movement longitudinally of the axis of rotation of the same, a support secured to the upper portion of the upwardly extending rod and extending laterally therefrom, gravity acting pointer members pivotally suspended from the support and arranged to swing in planes at right angles to each other and longitudinally and transversely with respect to the axis of rotation of the horizontally disposed member, and scales carried by the upwardly extending rod and extending from the same at right angles thereto and having graduations associated with the pointer members for indicating pivotal movement of the upwardly extending rod longitudinally of the axis of rotation of the horizontally disposed member and transversely thereof about said axis of rotation of the horizontally disposed member.

16. An automotive steering and inclination angles demonstrator comprising a base, a horizontally disposed member mounted on the base for rotary movement about a horizontal axis, an upwardly extending rod member pivotally mounted on said horizontally disposed member for tilting movement longitudinally of the axis of rotation of said horizontally disposed member, a knuckle member mounted on the rod member for rotation in a plane at right angles to the longitudinal axis of said rod member, a support fixed to the upper portion of said rod member, gravity acting pointers pivotally suspended from said support and movable in planes at right angles to each other and longitudinally and transversely of the axis of rotation of said horizontally disposed member, scales carried by the rod member and extending therefrom at right angles thereto and cooperating with said gravity acting pointers for indicating tilting movement of the rod member longitudinally of the axis of rotation of said horizontally disposed member and also transversely of the same, a spindle member extending laterally from the knuckle member and pivotally connected at its inner end with said knuckle member for pivotal adjustment in the plane of the longitudinal axis of the upwardly extending rod member, a camber degree graduated scale extending longitudinally of the spindle member and having a zero degree indication mark located midway of positive and negative zones of the camber degree graduations, and said scale being provided between said zero and the first of the full camber degree markings of the positive zone with three 20 minute subdivision graduations, supporting means carried by the spindle member and extending upwardly therefrom, a gravity acting pointer pivotally suspended from said supporting means and movable in the plane of the upwardly extending member, said last mentioned gravity acting pointer cooperating with said camber degree scale of the spindle member for indicating pivotal adjustment of the same.

17. An automotive steering and inclination angles demonstrator comprising a base, a horizontally disposed member journaled on the base for rotary movement about a horizontal axis, an upwardly extending member pivotally mounted on said horizontally disposed member for tilting movement longitudinally of the axis of rotation of said horizontally disposed member, a knuckle member mounted on said upwardly extending member for rotary movement in a plane at right angles to the longitudinal axis of said upwardly extending member, a spindle member extending laterally from said knuckle member and pivotally connected at its inner end with said knuckle member for pivotal adjustment in the plane of the longitudinal axis of said upwardly extending member, and means for indicating the extent of movement of the upwardly extending member, the knuckle member and the spindle member from predetermined positions.

18. An automotive steering and inclination angles demonstrator comprising a base, a horizontally disposed member journaled on the base for rotary movement about a horizontal axis, an upwardly extending member pivotally mounted on said horizontally disposed member for tilting movement longitudinally of the axis of rotation of said horizontally disposed member, a knuckle member mounted on said upwardly extending member for rotary movement in a plane at right angles to the longitudinal axis of said upwardly extending member, a spindle member extending laterally from said knuckle member and pivotally connected at its inner end with said knuckle member for pivotal adjustment in the plane of the longitudinal axis of said upwardly extending member, means including separate gravity acting means carried by and movable relative to said upwardly extending member for indicating pivotal movement of the upwardly extending member longitudinally and transversely of the axis of rotation of the horizontally disposed member, and means carried by said spindle member including gravity acting means for indicating the extent of pivotal movement of said spindle member in the plane of the longitudinal axis of the upwardly extending member.

19. An automotive steering and inclination angles demonstrator comprising a base, a horizontally disposed member journaled on the base for rotary movement about a horizontal axis, an upwardly extending member pivotally mounted on said horizontally disposed member for tilting movement longitudinally of the axis of rotation of said horizontally disposed member, a knuckle member mounted on said upwardly extending member for rotary movement in a plane at right angles to the longitudinal axis of said upwardly extending member, a spindle member extending laterally from said knuckle member and pivotally connected at its inner end with said knuckle member for pivotal adjustment in the plane of the longitudinal axis of said upwardly extending member, means including separate gravity acting means carried by and movable relative to said upwardly extending member for indicating pivotal movement of the upwardly extending member longitudinally and transversely of the axis of rotation of the horizontally disposed member, means carried by said spindle member including gravity acting means for indicating the extent of pivotal movement of said spindle member in the plane of the longitudinal axis of the upwardly extending member, and means for indicating rotary movement of the knuckle member with respect to said upwardly extending member.

GEORGE H. TABER.

References Cited in the file of this patent

UNITED STATES PATENTS

| Number | Name | Date |
|---|---|---|
| 1,530,832 | Johnston | Mar. 24, 1925 |
| 1,889,248 | Kilmer | Nov. 29, 1932 |
| 1,916,609 | Emmons | July 4, 1933 |